(12) United States Patent
Steinborn et al.

(10) Patent No.: US 7,846,061 B2
(45) Date of Patent: Dec. 7, 2010

(54) METHOD FOR OPERATING A DRIVE TRAIN OF A MOTOR VEHICLE

(75) Inventors: Mario Steinborn, Friedrichshafen (DE); Ulrich Reith, Schlier (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 391 days.

(21) Appl. No.: 11/909,281

(22) PCT Filed: Mar. 15, 2006

(86) PCT No.: PCT/EP2006/002387
§ 371 (c)(1), (2), (4) Date: Sep. 21, 2007

(87) PCT Pub. No.: WO2006/099982
PCT Pub. Date: Sep. 28, 2006

(65) Prior Publication Data
US 2008/0194379 A1 Aug. 14, 2008

(30) Foreign Application Priority Data
Mar. 24, 2005 (DE) .................. 10 2005 013 598

(51) Int. Cl.
| | | |
|---|---|---|
| B60W 10/08 | (2006.01) | |
| B60W 10/02 | (2006.01) | |
| F16N 7/26 | (2006.01) | |
| F16N 7/28 | (2006.01) | |
| F16N 7/38 | (2006.01) | |
| F16N 13/00 | (2006.01) | |
| F16H 57/04 | (2010.01) | |
| F01M 1/00 | (2006.01) | |
| F01M 9/06 | (2006.01) | |
| H02P 17/00 | (2006.01) | |

(52) U.S. Cl. ............... 477/5; 477/15; 184/6.12; 184/11.1; 184/13.1; 184/26; 903/945; 903/946

(58) Field of Classification Search ............ 477/15–17; 184/6.12, 11.1, 13.1, 26; 903/945, 946
See application file for complete search history.

(56) References Cited

U.S. PATENT DOCUMENTS

| | | | | |
|---|---|---|---|---|
| 4,951,466 | A * | 8/1990 | Macht | ............ 60/329 |
| 6,018,198 | A | 1/2000 | Tsuzuki et al. | |
| 6,019,698 | A | 2/2000 | Lawrie et al. | |
| 6,110,072 | A | 8/2000 | Harada et al. | |
| 6,428,447 | B2 * | 8/2002 | Onuki | ............ 477/99 |
| 6,645,105 | B2 | 11/2003 | Kima | |
| 6,705,416 | B1 | 3/2004 | Glonner et al. | |
| 6,746,354 | B1 | 6/2004 | Ziemer | |
| 6,863,140 | B2 | 3/2005 | Noreikat et al. | |
| 7,198,589 | B2 | 4/2007 | Hoetzer et al. | |
| 7,244,208 | B2 * | 7/2007 | Bauknecht et al. | ......... 475/5 |
| 7,410,446 | B2 * | 8/2008 | DeMarco | ............ 477/98 |
| 2001/0004620 | A1 | 6/2001 | Onuki | |
| 2003/0199353 | A1 | 10/2003 | Bowen | |
| 2004/0063533 | A1 | 4/2004 | Silveri et al. | |
| 2005/0054479 | A1 | 3/2005 | Masterson et al. | |
| 2006/0112695 | A1 * | 6/2006 | Neubauer et al. | ......... 60/714 |

FOREIGN PATENT DOCUMENTS

| | | |
|---|---|---|
| DE | 28 05 594 | 8/1979 |
| DE | 32 30 121 | 2/1984 |
| DE | 295 02 906 | 6/1995 |
| DE | 44 22 554 | 10/1995 |
| DE | 195 03 500 | 8/1996 |
| DE | 195 30 233 | 2/1997 |
| DE | 197 48 423 | 2/1999 |
| DE | 198 38 853 | 3/1999 |
| DE | 199 29 770 | 1/2000 |
| DE | 199 17 665 | 10/2000 |
| DE | 199 23 316 | 11/2000 |
| DE | 101 00 007 | 7/2001 |
| DE | 101 48 345 | 4/2003 |
| DE | 102 28 636 | 4/2003 |
| DE | 101 60 466 | 6/2003 |
| DE | 102 46 839 | 4/2004 |
| DE | 102 51 627 | 5/2004 |
| DE | 103 15 683 | 10/2004 |
| EP | 1 077 150 | 2/2001 |
| EP | 1 177 927 | 7/2001 |
| FR | 2 699 127 | 6/1994 |

* cited by examiner

*Primary Examiner*—Tisha D Lewis
(74) *Attorney, Agent, or Firm*—Davis & Bujold, P.L.L.C.

(57) ABSTRACT

A method for operating a drivetrain of a motor vehicle having in the force flow direction and in the following order an internal combustion engine, a clutch, an electric motor, a transmission and an axle gearset, or an internal combustion engine, a clutch, an electric motor, a transmission input shaft, a transmission and an axle gearset. The electric motor is used for pre-lubricating and warming the transmission such that, with the vehicle clutch disengaged, the lubricant pump of the transmission is driven by the electric motor so bearings are supplied with lubricant before the engine is started, and the heat, produced by splashing the lubricant, additionally warms the transmission.

7 Claims, No Drawings

METHOD FOR OPERATING A DRIVE TRAIN OF A MOTOR VEHICLE

This application is a national stage completion of PCT/EP2006/002387 filed Mar. 15, 2006 which claims priority from German Application Serial No. 10 2005 013 598.6 filed Mar. 24, 2005.

FIELD OF THE INVENTION

The present invention concerns a method for operating a drivetrain of a motor vehicle which, in the force flow direction, comprises in the following order an internal combustion engine, a clutch, an electric motor, a main transmission and an axle gearset, or an internal combustion engine, a clutch, an electric motor, an input shaft to the main transmission and an axle gearset.

BACKGROUND OF THE INVENTION

From the prior art drivetrains for motor vehicles are known which comprise an electric motor, such electric motors are used as drive motors enabling low-emission and almost silent driving, but disadvantageously having only limited drive power. For that reason so-termed hybrid drives have been developed, in which the main power assembly is an internal combustion engine and an electric motor is used as an auxiliary assembly which is arranged in series or in parallel with the drivetrain between the combustion engine and the transmission.

For example, from DE 199 17 665 a hybrid drive for a motor vehicle is known, which comprises in the drivetrain between the combustion engine and the transmission a first electric machine and a second electric machine permanently connected to the transmission input shaft. In this, a shiftable clutch is arranged between the two electric machines, which can each be operated as a motor and a generator, and the combustion engine. This design on the one hand has the advantage that there is no need for electric components such as a starter, generator or pump drive since one of the electric machines can be used as a starter, generator or pump drive. On the other hand, the disadvantage is that two electric machines are needed, and this has a negative effect on manufacturing costs.

Furthermore, from the prior art an arrangement of components of the drivetrain of a motor vehicle is known, which comprises an electric motor and in which, by using an electric motor, other electric components such as a starter, generator etc. can be omitted. In such an arrangement the drivetrain comprises, in the following order, the combustion engine, a clutch, an electric motor, a transmission and an axle gearset, or the combustion engine, a clutch, an electric motor, an input shaft to the transmission, a transmission and an axle gearset.

This arrangement has the added advantage that only one electric motor is needed. For such an arrangement certain applications are also known, such as for example using the electric motor for synchronizing the shifts in a transmission or using the electric motor to assist starting driving and/or maneuvering, the starting drive or maneuvering process being carried out with electric motor support or independently.

In addition, the electric motor can be used to adjust the torque of the clutch characteristic, and for this purpose the transmission is shifted to neutral and the clutch brought to a slipping condition. Then, a defined torque is set at the electric motor. At constant slip the torque at the electric motor corresponds to the transmissible torque at the clutch for the clutch travel point in question. In a further advantageous application of the electric motor, the motor is used to enhance the plausibility of the engine torque of the combustion engine.

SUMMARY OF THE INVENTION

The purpose of the present invention is to disclose a method for operating a drivetrain of a motor vehicle, which comprises in the force flow direction and in the following order an internal combustion engine, a clutch, an electric motor, a transmission and an axle gearset, or an internal combustion engine, a clutch, an electric motor, an input shaft to the transmission, a transmission and an axle gearset, the method enabling versatile utilization of the electric motor integrated in the drivetrain.

DETAILED DESCRIPTION OF THE INVENTION

Accordingly, in the context of the method of the invention it is proposed to use the electric motor for pre-lubricating and warming of the transmission, such that when the vehicle clutch is disengaged, the lubricant pump of the transmission is driven by the electric motor. In this way the bearings are supplied with lubricant before the engine is started, and the heat produced by splashing lubricant warms up the transmission. In an advantageous way, sprayed lubricant distributes a lubricant coating over the tooth flanks and other moving parts of the transmission.

For example in the case of a range-change transmission, to pre-lubricate and warm up the transmission the clutch can be opened, the split group and the main transmission engaged, the range group shifted to "Neutral" and the transmission input shaft driven by the electric motor.

In an advantageous further development of the invention it is proposed to use the electric motor for starting the drive engine (combustion engine). Here, with the clutch disengaged the inertia associated with the transmission input shaft are accelerated by the electric motor so that when the clutch is engaged to start the engine, the inertia of the already accelerated masses acts to assist the turning over the combustion engine.

For example, this can take place in the case of a range-change transmission in that with the clutch disengaged, the split group and the main transmission are engaged, the range group is set to "Neutral", the transmission input shaft is accelerated by the electric motor, the combustion engine is prepared for starting, and the clutch is then engaged.

In a particularly advantageous embodiment of the invention it is proposed to use the electric motor for diagnostics in an automated shift transmission, such that for this purpose the individual elements of the transmission are moved by the electric motor. This is particularly advantageous in components without synchronization equipment and only with rotating wheels. In addition the electric motor can be used for transmission calibration, in that the electric motor is used to drive the individual components of the transmission. This can be done particularly for components without synchronization means. In this way, dependence on the combustion engine is eliminated.

The design of the shift actuators needed shifts in automated shift transmission is determined essentially by the force required to separate a shift clutch which has stuck together because of the adhesion force of cold oil. According to the invention, rapid changes of the electric motor's rotational direction in short intervals allow the shift clutch to shake itself free, so that the shift actuators can advantageously be made smaller.

In the context of the method according to the invention it is also proposed to use an appropriately sized electric motor to drive at least one reverse gear. For this, with the clutch disengaged the electric motor takes over the drive in the desired direction. In this, for reverse driving either all the possible transmission ratios or a given selection of the available ratios can be used.

The invention claimed is:

1. A method of operating a drivetrain of a motor vehicle which includes, in a force flow direction in the following sequential order:
   an internal combustion engine,
   a clutch,
   an electric motor,
   a transmission, and
   an axle gearset
such that the electric motor facilitates pre-lubrication and warming of the transmission, and the transmission is a range-change transmission and a transmission input shaft is located between the electric motor and the transmission, the method comprising the steps of:
   disengaging the clutch,
   driving a lubricant pump of the transmission with the electric motor so that bearing points are supplied with a lubricant before the internal combustion engine is started, and
   warming the transmission, via heat produced by lubricant displacement, prior to starting the internal combustion engine, and
   after the clutch is disengaged, engaging a split group and the transmission, shifting a range group into "neutral" and driving the transmission input shaft with the electric motor.

2. A method of operating a drivetrain of a motor vehicle which includes, in a force flow direction in the following sequential order:
   an internal combustion engine,
   a clutch,
   an electric motor,
   a transmission, and
   an axle gearset
such that the electric motor facilitates pre-lubrication and warming of the transmission, the method comprising the steps of:
   disengaging the clutch,
   driving a lubricant pump of the transmission with the electric motor so that bearing points are supplied with a lubricant before the internal combustion engine is started, and
   warming the transmission, via heat produced by lubricant displacement, prior to starting the internal combustion engine,
   after disengaging the clutch, accelerating masses associated with a transmission input shaft, and
   starting the combustion engine by engaging the clutch such that inertia of the accelerated masses facilitates starting the combustion engine.

3. The method for operating the drivetrain of the motor vehicle according to claim 2 in which the transmission is a range-change transmission and the transmission input shaft is located between the electric motor and the transmission, further comprising the step of, after the clutch is disengaged, engaging a split group and the transmission, shifting a range group into "Neutral", accelerating the transmission input shaft with the electric motor, preparing the combustion engine for starting, and engaging the clutch to start the combustion engine.

4. The method for operating the drivetrain of the motor vehicle according to claim 2, wherein the transmission is an automatic transmission having components with no synchronization, further comprising the step of moving individual components of the transmission with the electric motor to facilitate diagnosis and transmission calibration.

5. The method for operating the drivetrain of the motor vehicle according to claim 2, further comprising the step of rapidly changing a rotational direction of the electric motor, during short intervals, to facilitate separation of transmission shifting elements.

6. The method for operating the drivetrain of the motor vehicle according to claim 2, after the clutch is disengaged, further comprising the step of driving the drivetrain in a reverse gear with the electric motor.

7. The method for operating the drivetrain of the motor vehicle according to claim 6, further comprising the step of driving the drivetrain in the reverse gear with the electric motor employing one of all possible transmission ratios and a given selection of all the possible transmission ratios.

* * * * *